United States Patent [19]
Shrock et al.

[11] Patent Number: 5,455,913
[45] Date of Patent: Oct. 3, 1995

[54] SYSTEM AND METHOD FOR TRANSFERRING DATA BETWEEN INDEPENDENT BUSSES

[75] Inventors: Eugene L. Shrock, Castle Rock; William K. Petty, Colorado Springs, both of Colo.

[73] Assignees: AT&T Global Information Solutions Company, Dayton, Ohio; Hyundai Electronics America, Milpitas, Calif.

[21] Appl. No.: 68,582

[22] Filed: May 26, 1993

Related U.S. Application Data

[63] Continuation of Ser. No. 522,715, May 14, 1990, abandoned.

[51] Int. Cl.$^6$ .................................................. G06F 13/00
[52] U.S. Cl. ........................ 395/280; 364/DIG. 1; 364/238.6; 364/239; 364/239.1; 364/239.5; 364/239.7; 364/240; 364/240.2; 364/241.9; 364/251.3; 364/260; 364/260.1; 395/250; 395/854
[58] Field of Search ........................ 395/250, 275, 395/325

[56] References Cited

U.S. PATENT DOCUMENTS

| | | | |
|---|---|---|---|
| 3,836,891 | 9/1974 | McDaniel | 364/474.01 |
| 4,125,870 | 11/1978 | Suzuki et al. | 395/275 |
| 4,187,394 | 2/1980 | Sievers | 370/41 |
| 4,258,418 | 3/1981 | Heath | 395/250 |
| 4,285,038 | 8/1981 | Suzuki et al. | 395/325 |
| 4,413,317 | 11/1983 | Swenson | 395/425 |
| 4,613,954 | 9/1986 | Sheth | 395/250 |
| 4,644,463 | 2/1987 | Hotchkin et al. | 395/250 |
| 4,649,512 | 3/1987 | Nukiyama | 395/325 |
| 4,748,588 | 5/1988 | Norman et al. | 395/250 |
| 4,860,193 | 8/1989 | Bentley | 395/250 |
| 4,862,419 | 8/1989 | Hoberman | 365/221 |
| 4,866,609 | 9/1989 | Calta et al. | 395/250 |
| 4,873,666 | 10/1989 | LeFebvre et al. | 365/189.07 |
| 4,945,548 | 7/1990 | Iannarone et al. | 375/4 |
| 5,019,964 | 5/1991 | Yamamoto et al. | 395/250 |

*Primary Examiner*—Jack B. Harvey
*Assistant Examiner*—Ayaz Rafi Sheikh
*Attorney, Agent, or Firm*—Wayne P. Bailey; Douglas S. Foote

[57] ABSTRACT

A system and method for transferring a designated number d of data bytes between first and second data busses. The system includes a data buffer connected between the busses, a full counter, a partial counter, and decode logic connected to the counters. The full counter counts the total number of data bytes transferred between the buffer and the first bus. The partial counter counts data bytes transferred between the buffer and the second bus. The decode logic indicates when d data bytes have been transferred between the busses.

22 Claims, 13 Drawing Sheets

SYSTEM AND METHOD FOR TRANSFERRING DATA BETWEEN INDEPENDENT BUSSES

This is a continuation of application Ser. No. 07/522,715 filed on May 14, 1990, now abandoned.

The present invention relates to a system and method for the transfer of data between two busses. More particularly, it relates to a system and method for independently handling and tracking the transfer of a specified number of data bytes, and for generating control signals upon completion of the transfer.

BACKGROUND OF THE INVENTION

In computer systems, data is frequently transferred between devices connected to different busses. For example, a disk drive connected to a standard I/O bus may be requested to transfer data to a main memory connected to a system bus. Data transfers between two such busses normally occur through an interface buffer connected between the busses. The data buffer is used to temporarily store the data as it is transferred between the devices. The need to buffer data arises because the receiver may be busy when the data is transferred, or because the transfer rates and/or bus widths of the transmitter and receiver are different.

A conventional interface is a first-in first-out (FIFO) buffer in which data elements (typically data bytes) are read out in the same order in which they are read into the buffer. A dual-ported FIFO allows data to be simultaneously read from and written to the buffer. Thus, data may be transferred from a disk drive to the buffer at the operating frequency of the disk drive, and, after a predetermined amount of data is stored, the data may be transferred or burst from the buffer to main memory at the relatively faster operating frequency of main memory. Control of the buffer, or at least monitoring of the amount of data transferred, is normally provided by the system processor.

A buffer may be combined with control logic to form an interface device between the two busses for transferring data through the buffer. For example, such an interface device may receive a request from a processor to transfer a designated number of data bytes from a disk drive to the system's main memory. The interface device may then take control of the transfer, providing a signal to the processor when the transfer is complete. In order to determine when to generate the transfer complete signal, the number of bytes actually transferred must be accurately tracked. In addition, both the transmitting and receiving devices must be notified when the transfer is complete.

The number of logic gates required to implement an interface device capable of tracking large block transfers can consume excessive chip space. This can have an adverse impact on chip costs.

OBJECTS OF THE INVENTION

It is therefore an object of the present invention to provide a new and improved system and method for transferring data between two busses.

It is another object of the present invention to provide a system which can transfer data between two busses without requiring the attention of an external processor.

It is yet another object of the present invention to provide a data transfer system with a reduced amount of logic.

SUMMARY OF THE INVENTION

The present invention is a system and method for transferring a designated number d of data bytes between first and second data busses. One form of the system includes a data buffer connected between the busses, a full counter, a partial counter and indicating means connected to the counters. The full counter counts the total number of data bytes transferred between the buffer and the first bus. The partial counter counts data bytes transferred between the buffer and the second bus. The indicating means indicate when d data bytes have been transferred between the busses.

DESCRIPTION OF A PREFERRED EMBODIMENT

Figure 1:
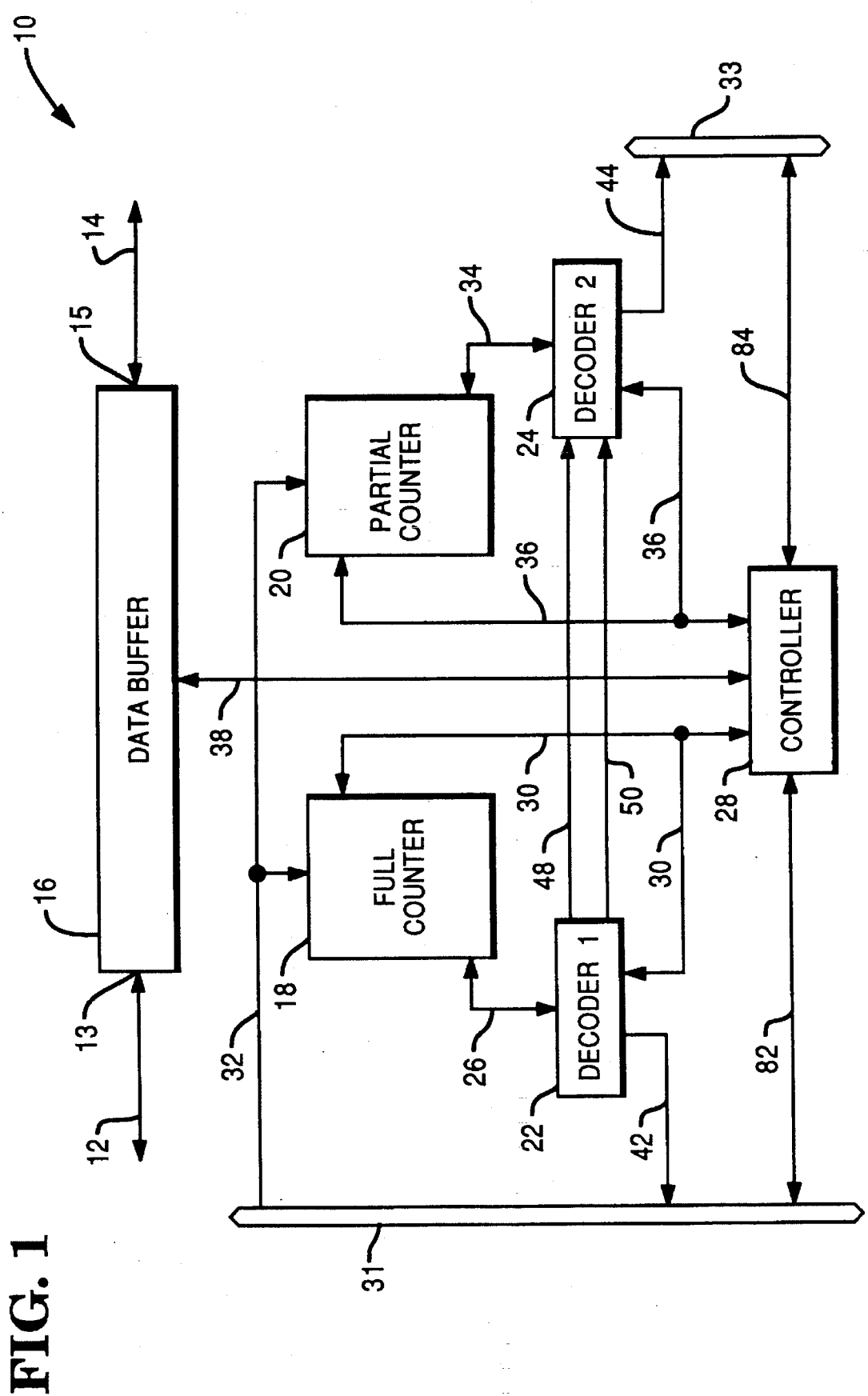
FIG. 1 is a schematic block diagram of a data transfer system according to one form of the present invention.

FIG. 1 shows a system 10 for transferring data bytes between independent busses 12 and 14. The term "byte" as used herein refers to a group of one or more binary data bits. In the following detailed description of the present invention, each byte includes nine bits, eight data and one parity. System 10 includes data buffer 16, counters 18 and 20, and decoders 22 and 24. Data buffer 16 is connected between data busses 12 and 14, with buffer 16 being connected to bus 12 at port 13 and being connected to bus 14 at port 15. Counter 18 is connected to decoder 22 by bus 26, to a counter/buffer controller 28 by signal bus 30 and to a bus 12 control line port 31 by bus 32. Counter 20 is connected to decoder 24 by bus 34, to counter/buffer controller 28 by signal bus 36 and to port 31 by bus 32. Data buffer 16 is connected to counter/buffer controller 28 by control bus 38. Decoders 22 and 24 are connected to controller 28 by signal busses 30 and 36, respectively. Decoders 22 and 24 are also connected to control lines 42 and 44, respectively, and are connected to each other by a signal bus which includes lines 48 and 50. Counter/buffer controller 28 is connected to port 31 and to control line port 33 by control busses 82 and 84, respectively.

Figure 2A:
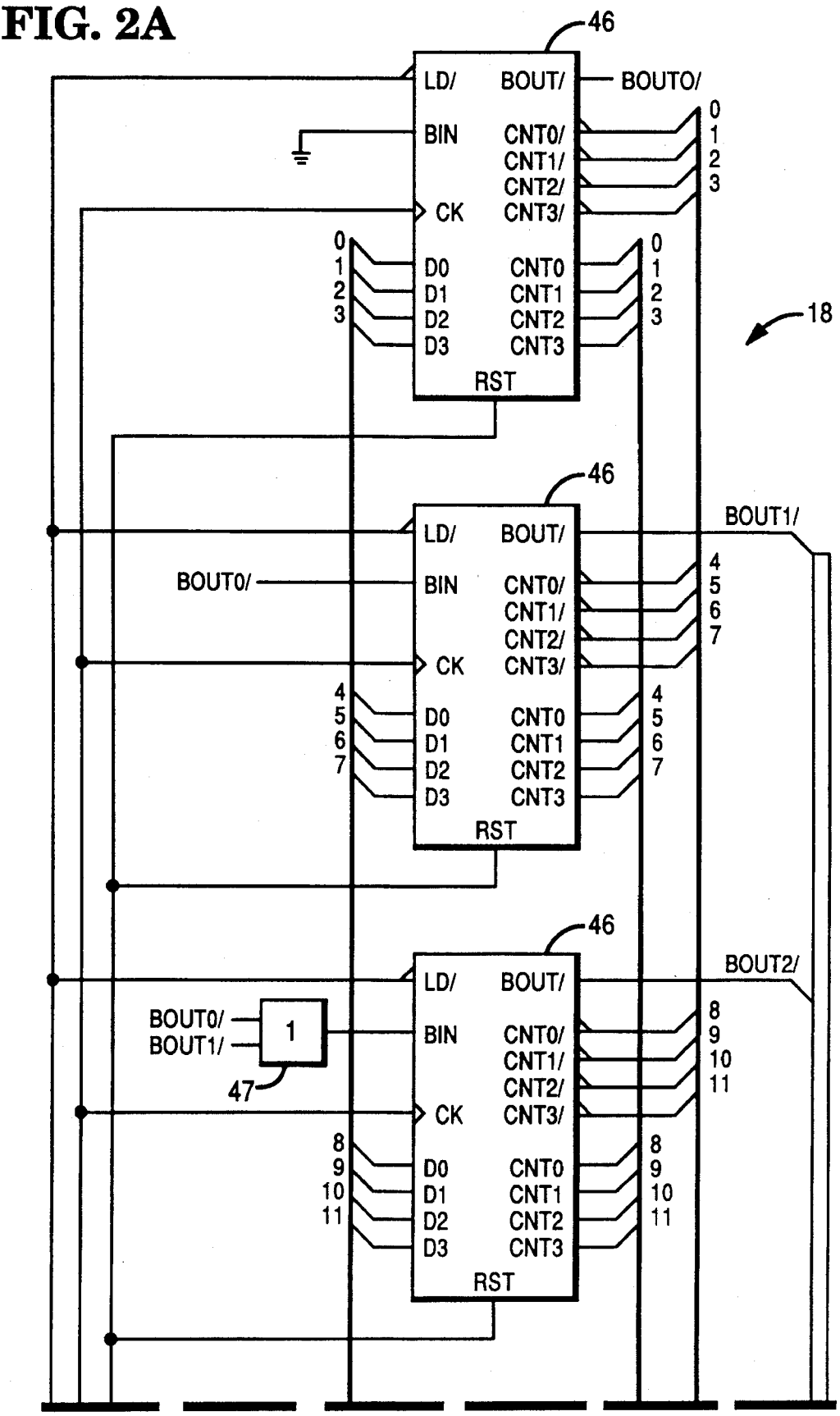
FIG. 2A and 2B are a circuit diagram of full scale counter 18 shown in FIG. 1.
Figure 2B:
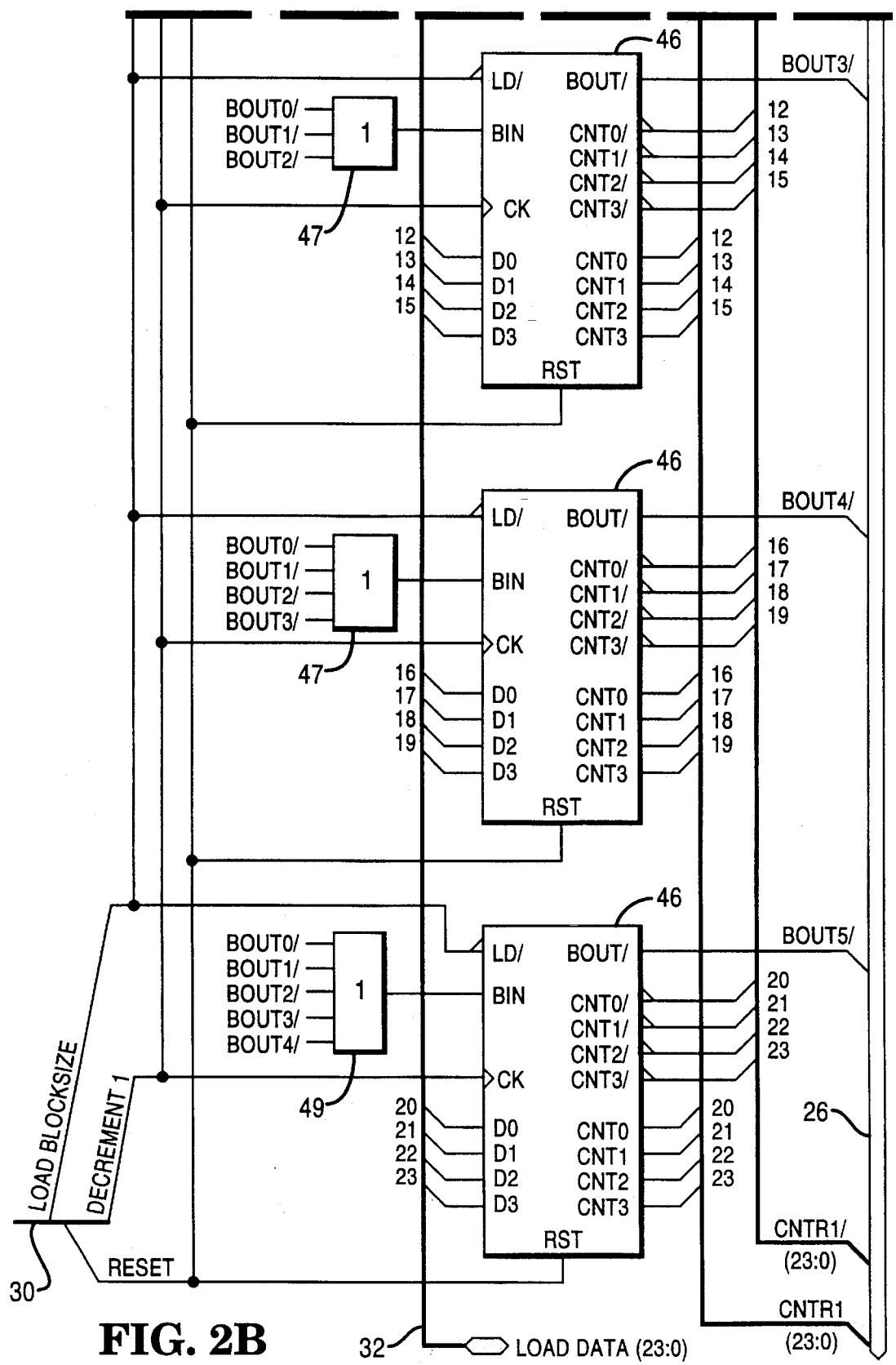
Figure 3:
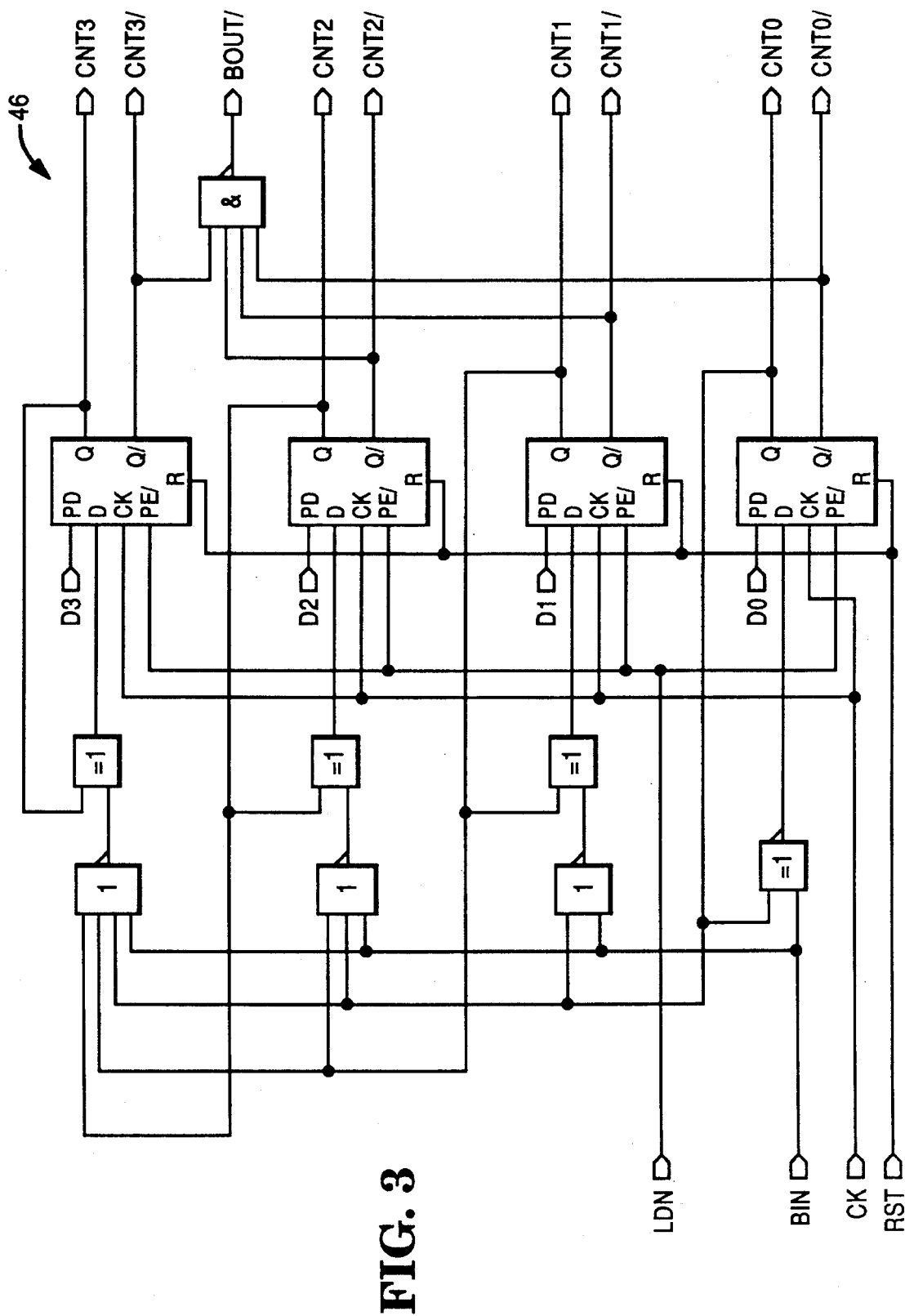
FIG. 3 is a circuit diagram of a 4 bit counter 46 shown in FIG. 2.

FIGS. 2A and 2B show a 24 bit full scale counter such as may be employed as counter 18 in FIG. 1. Counter 18 includes six 4 bit counters 46, OR gates 47 and NOR gate 49, connected as shown. A 24 bit binary number, LOAD DATA (23:0), may be loaded into counter 18 on bus 32 in response to a LOAD BLOCKSIZE control signal received on signal bus 30. The current count in counter 18, CNTR1 (23:0), is output on bus 26. A DECREMENT1 signal which decrements counter 18 is received on signal bus 30. The inverted count, CNTR1/ (23:0), is output on lines of bus 26. Counter 18 is cleared in response to the RESET signal received on signal bus 30. FIG. 3 shows the detail of a counter 46 in FIG. 2.

Figure 4:
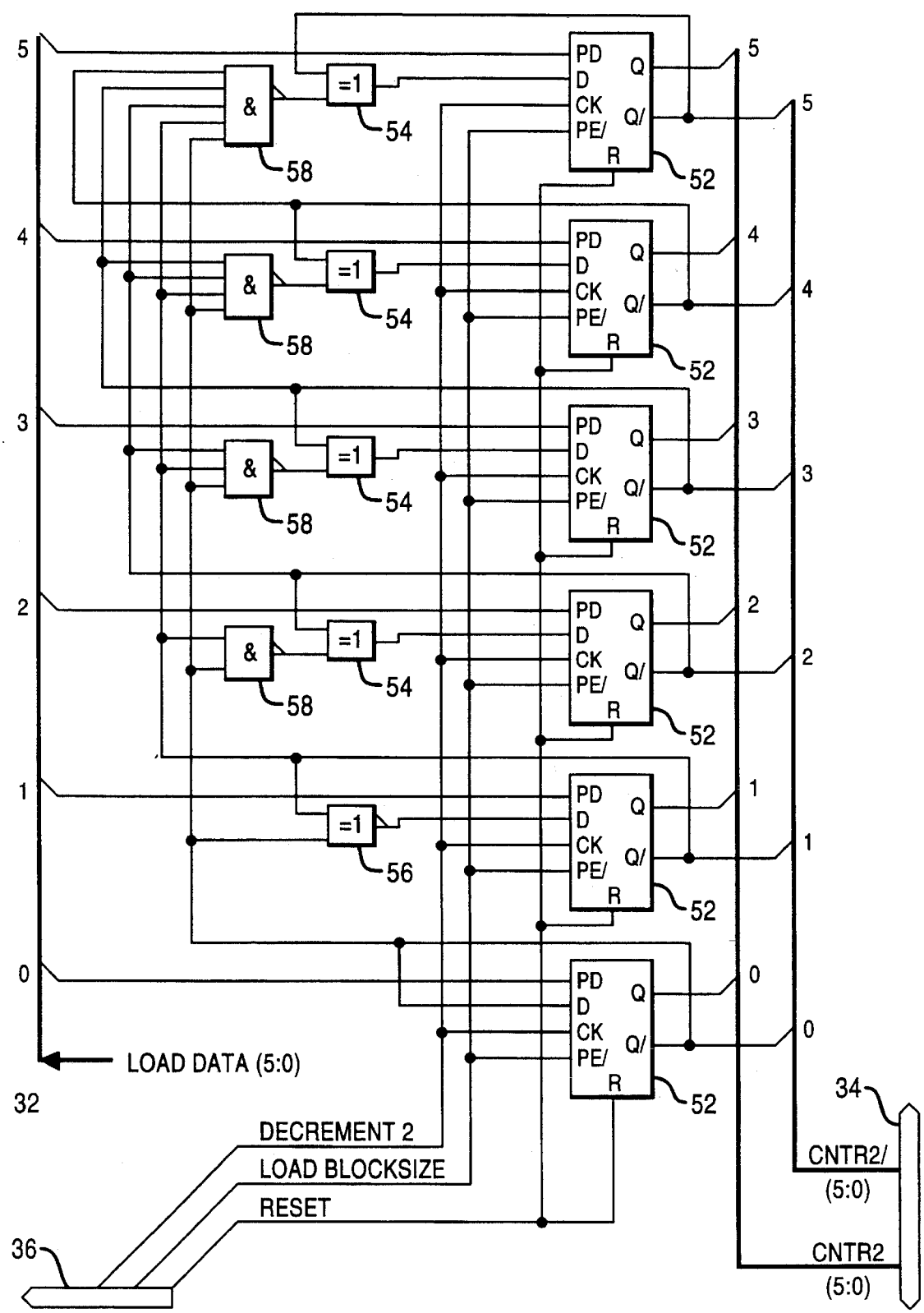
FIG. 4 is a circuit diagram of partial counter 20 shown in FIG. 1.

FIG. 4 shows a 6 bit partial counter such as may be employed as counter 20 in FIG. 1. Counter 20 includes six D-type flip-flops 52, EXOR gates 54, EXNOR gate 56 and NAND gates 58, connected as shown. A six bit binary number, LOAD DATA (5:0), may be loaded into counter 20 on bus 32 in response to a LOAD BLOCKSIZE control signal received on signal bus 36. As will be described more fully, these six bits are equal to the six low order bits of the 24 bit binary number loaded into counter 18. The current count in counter 20, CNTR2 (5:0), is output on bus 34. A DECREMENT2 signal which decrements counter 20 is received on a line of signal bus 36. The inverted count, CNTR2/ (5:0), is output on bus 34. Counter 20 is cleared in response to a RESET signal received on signal bus 36.

Figure 5:
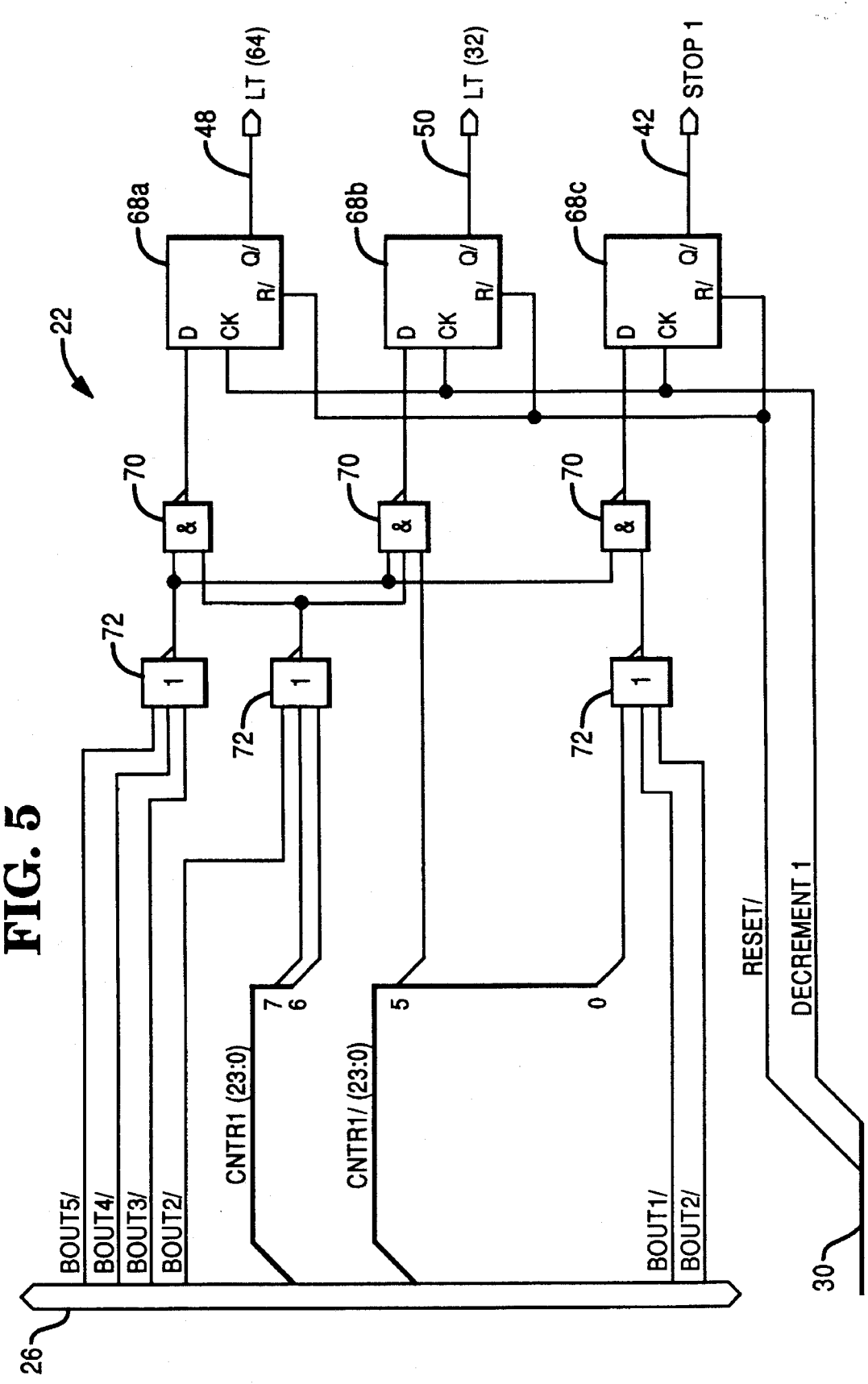
FIG. 5 is a circuit diagram of decoder 22 shown in FIG. 1.

FIG. 5 is a logic diagram of one embodiment of decoder 22. Decoder 22 includes D-type flip-flops 68a, 68b and 68c, NAND gates 70 and NOR gates 72, connected as shown. Selected count data from counter 18 is received over bus 26. D-type flip-flops 68a, 68b and 68c are clocked by the DECREMENT1 signal and reset by the RESET signal, both received on signal bus 30. The Q/ output of flip-flop 68a, signal LT(64) line 48, goes active when the count in counter 18 is less than 64. The Q/ output of flip-flop 68b, signal LT(32) on line 50, goes active when the count in counter 18 is less than 32. The Q/ output of flip-flop 68c, signal STOP1 on line 42, goes active when the count in counter 18 is zero.

Figure 6:
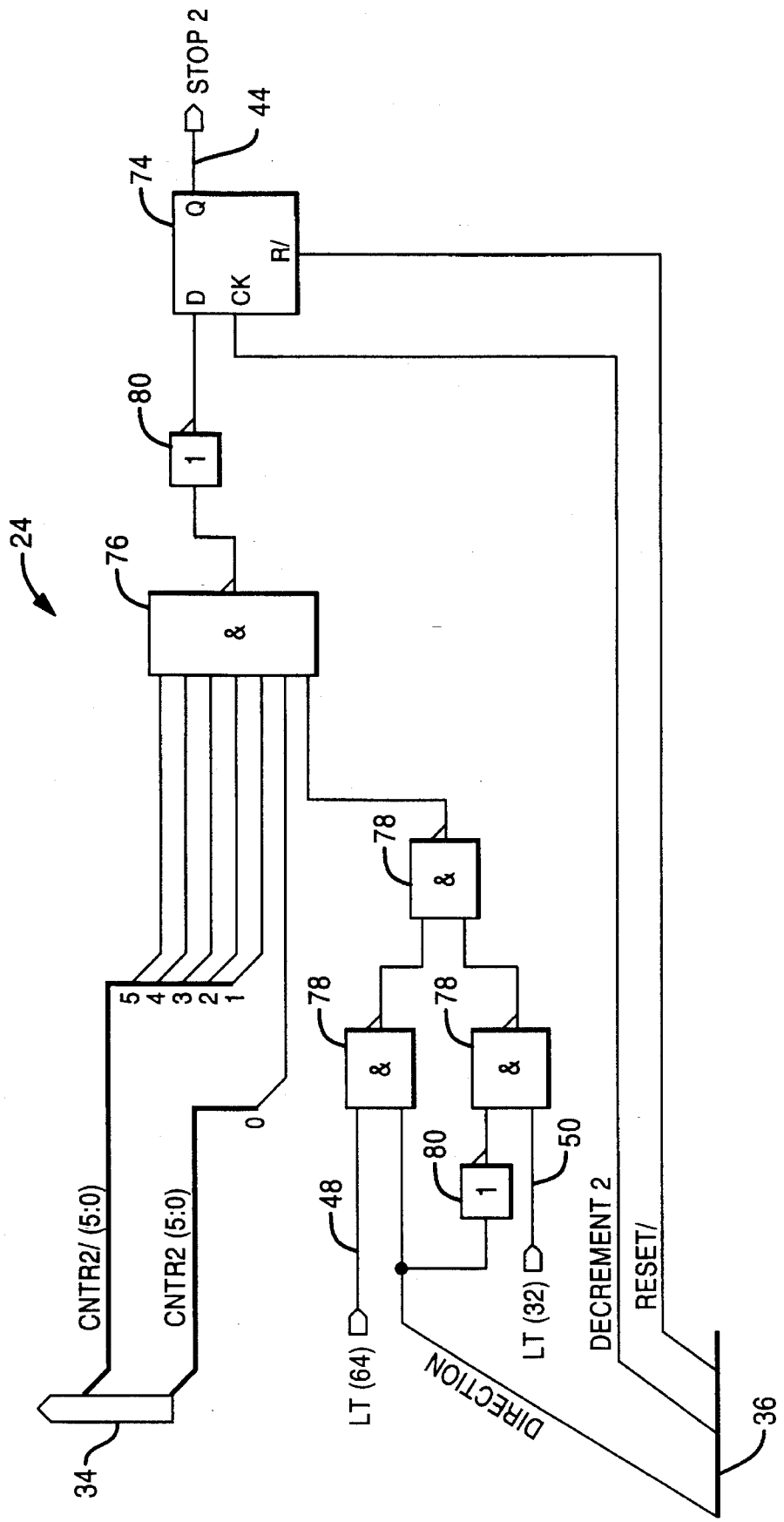
FIG. 6 is a circuit diagram of decoder 24 shown in FIG. 1.

FIG. 6 is a logic diagram of one embodiment of decoder 24. Decoder 24 includes a D-type flip-flop 74, an AND gate 76, NAND gates 78, and inverters 80, connected as shown. Count data from counter 20 is received over bus 34. D-type flip-flop 74 is clocked by the DECREMENT2 signal and reset by the RESET signal, both received on bus 36. The LT(64) and LT(32) signals are received from decoder 22 over lines 48 and 50, respectively. A DIRECTION signal, indicating whether the data transfer is from bus 12 to bus 14 or from bus 14 to bus 12, is also received from counter/buffer controller 28 over bus 36. The Q output of flip-flop 74, signal STOP2 on line 44, goes active when the count in counter 20 is zero and the count in counter 18 is less than 64 or 32, as will be explained more fully.

Figure 7:
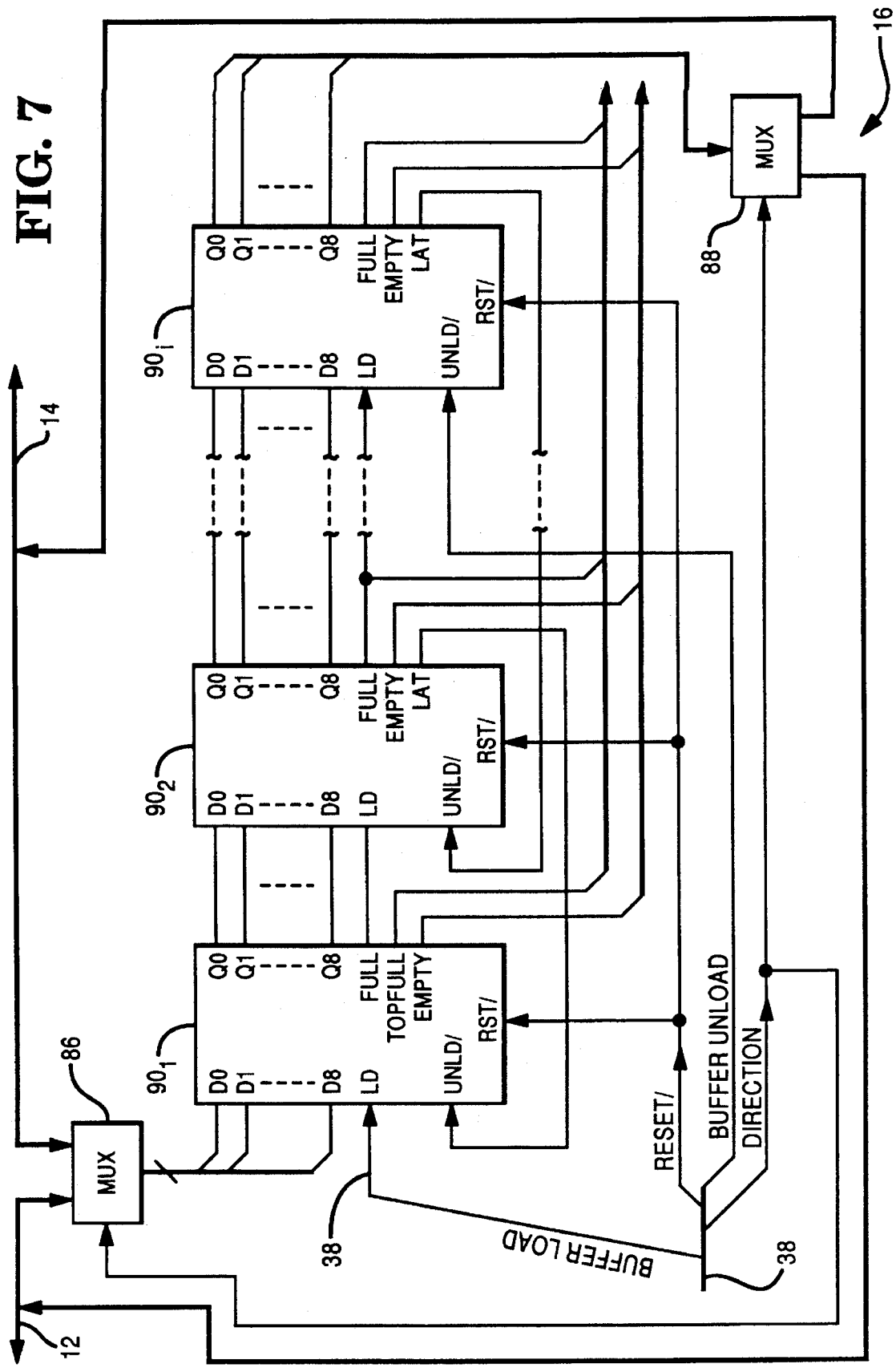
FIG. 7 is a circuit diagram of buffer 16 shown in FIG. 1.

FIG. 7 shows a block diagram of a first-in, first-out (FIFO) data buffer 16 according to one form of the present invention. Each data bus 12 and 14 is connected to multiplexers 86 and 88. The direction of data flow between busses 12 and 14 is controlled by the DIRECTION control signal received by multiplexers 86 and 88 on bus 38. Data bytes are transferred into buffer 16 through multiplexer 86, and data bytes are transferred out of buffer 16 through multiplexer 88. Buffer 16 includes a plurality of adjacent stages $90_1$, $90_2$, . . . , $90_i$, where i=data byte capacity of buffer 16. Stage $90_1$ receives the BUFFER LOAD signal over a line of bus 38 to transfer a data byte from the selected data bus 12 or 14 into stage $90_1$. Stage $90_i$ receives the BUFFER UNLOAD signal from a line of bus 38 to transfer a data byte from stage $90_i$ to the selected data bus 12 or 14 through multiplexer 88. Buffer 16 is sometimes referred to as a "fall-through" FIFO buffer because data bytes received from one data bus at stage $90_1$ ripple or fall through adjacent empty stages until transferred out of the last stage $90_i$ to the other data bus.

Figure 8A:
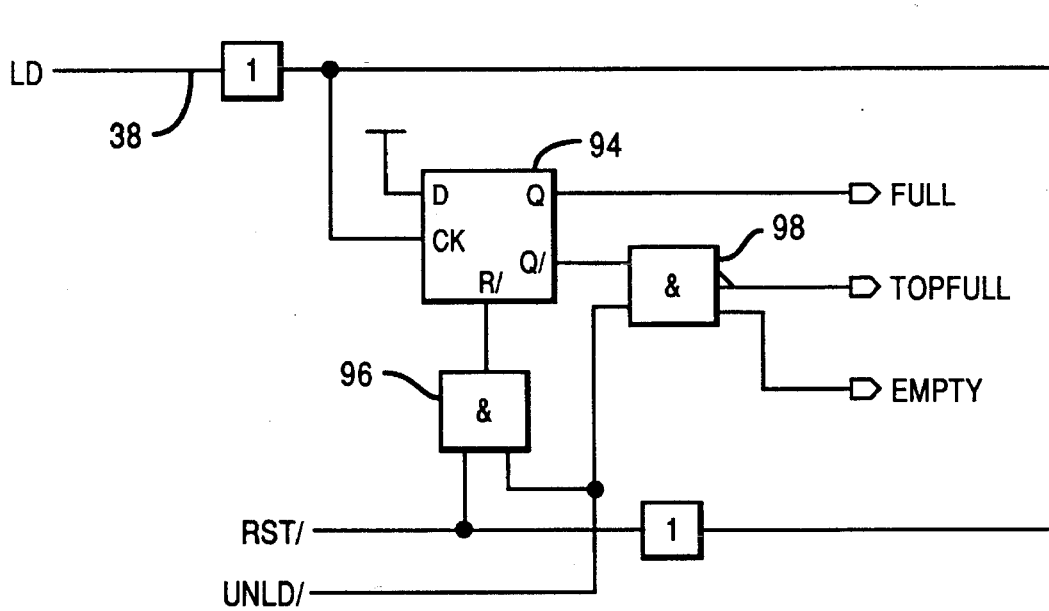
FIG. 8A and 8B are a circuit diagram of the top most FIFO buffer stage $90_1$ shown in FIG. 7.
Figure 8B:
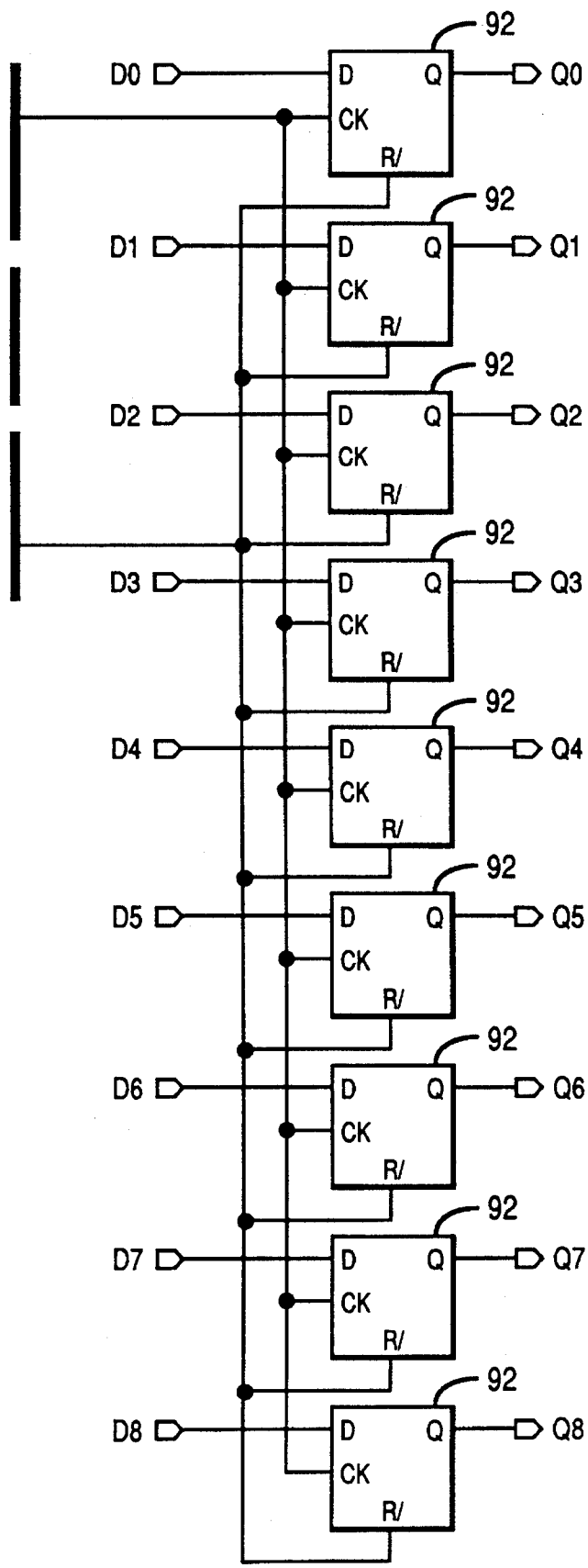

FIGS. 8A and 8B show greater detail of stage $90_1$ from FIG. 7. Stage $90_1$ includes a number of D-type flip-flops 92, each receiving an individual data bit D0, D1, . . . D8, respectively, on its D input and providing such bit on its Q output. The clock input CK of each flip-flop 92 is connected to a line of bus 38 and is enabled upon receipt of the LD signal. D-type flip-flop 94, AND gate 96 and NAND gate 98, connected as shown, receive the LD signal, an UNLD/ signal from stage $90_2$, and a reset signal RST/, and generate FULL, TOPFULL, and EMPTY signals. The FULL signal is provided as a load signal to the next stage $90_2$. The TOPFULL and EMPTY signals are flags indicating the status of stage $90_1$. These flags may be combined with similar flags from the other stages to provide status information relating whether data buffer 16 is full or empty, and are subsequently used to generate the SPACE AVAILABLE, and DATA AVAILABLE signals.

Figure 9A:
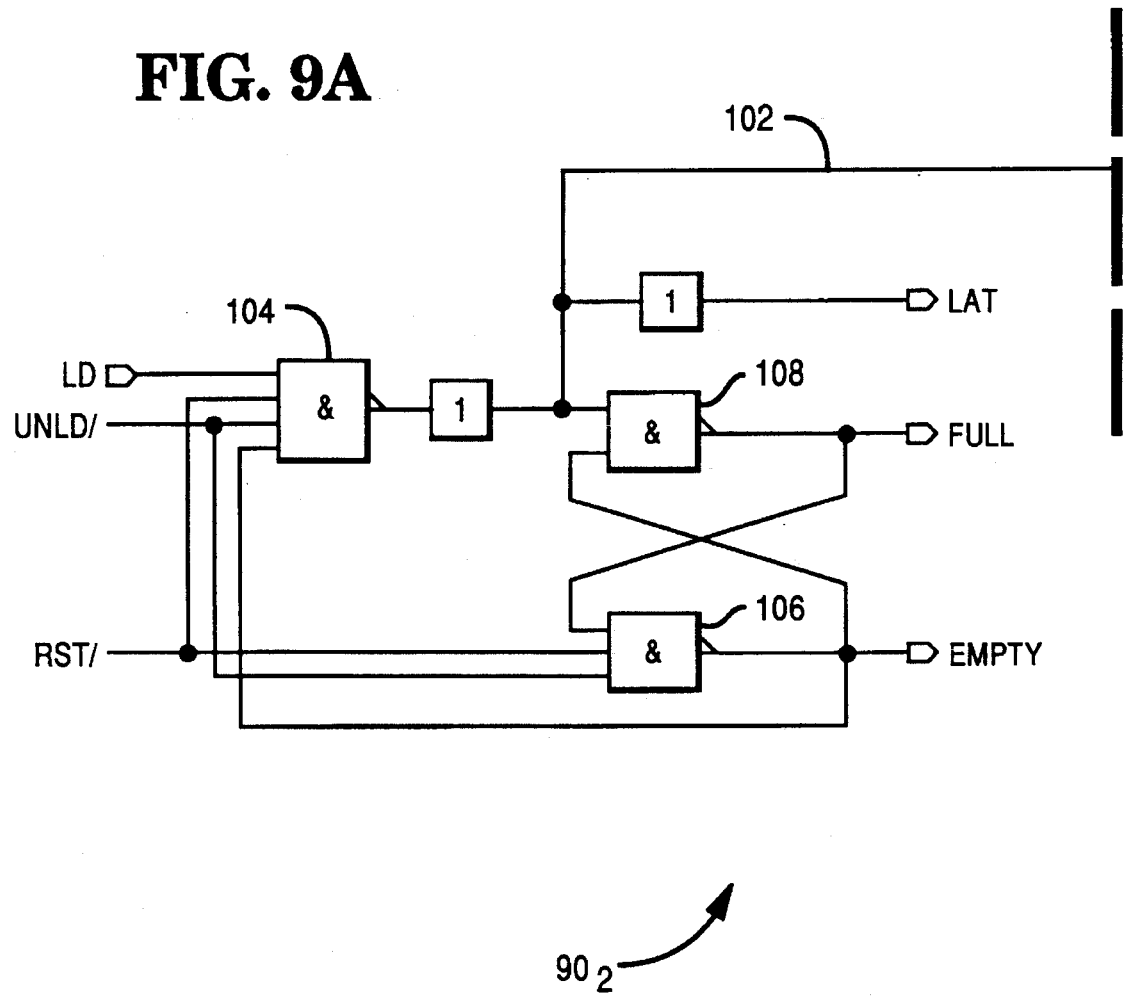
FIG. 9A and 9B are a circuit diagram of one of the other FIFO buffer stages 90 shown in FIG. 7.
Figure 9B:
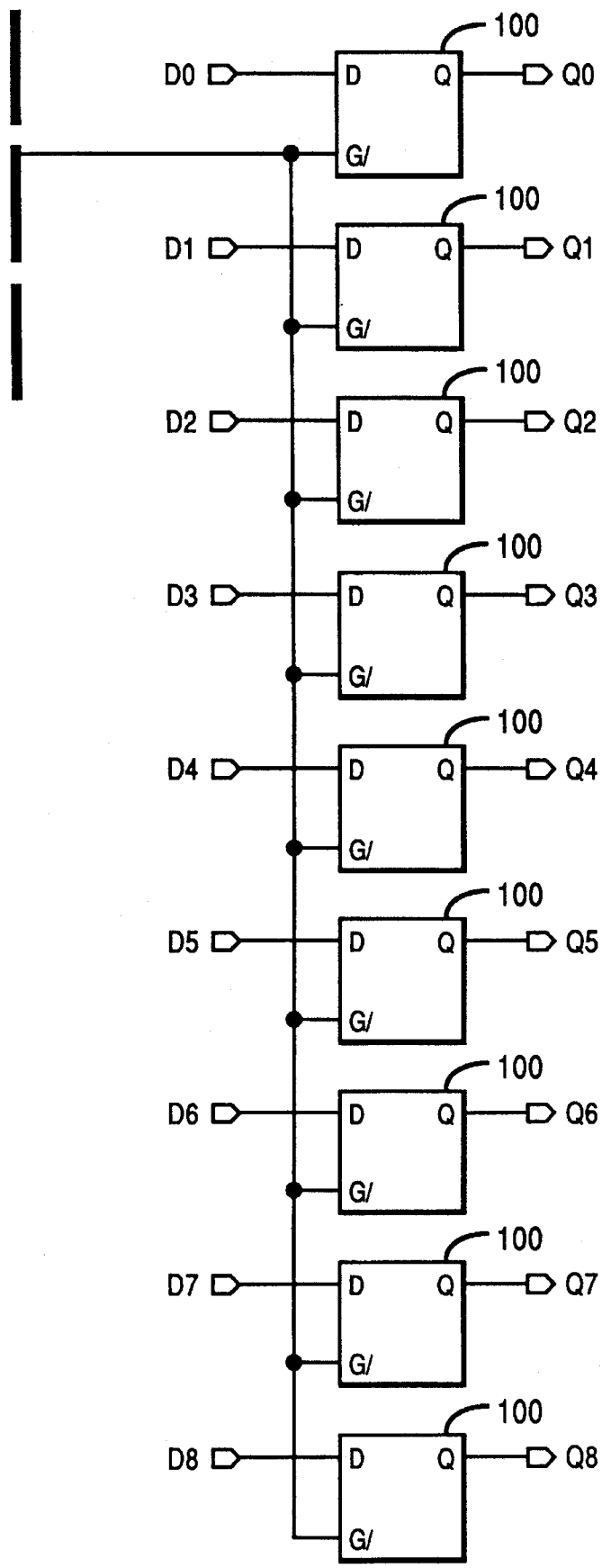

FIGS. 9A and 9B show greater detail of stage $90_2$ as well as subsequent stages $90_3$, $90_4$, . . . $90_i$ from FIG. 7. Stage $90_2$ includes a number of latches 100, each receiving an individual data bit D0, D1, . . . D8, respectively, on its D input and providing such bit on its Q output. The G/ input of each latch 100 is connected to line 102. When G/ goes low, latches 100 are transparent, and when G/is high, data is latched. NAND gates 104, 106 and 108, connected as shown, receive the LD signal from the preceding stage, the UNLD/ signal from the LAT output of the next stage (except for stage $90_i$ which receives the BUFFER UNLOAD signal from a line of bus 38), and a reset signal RST/. NAND gates 104, 106 and 108 generate LAT, FULL, and EMPTY signals. The LAT signal is provided to the preceding stage as its UNLD/ signal. The FULL signal is provided as a load signal to the next stage $90_2$. The FULL and EMPTY signals are flags indicating the status of stage $90_2$. These flags may be combined with similar flags from the other stages to provide status information relating whether data buffer 16 is full or empty.

Referring to FIGS. 7–9; a data byte transferred from bus 12 or 14 into buffer 16 is first loaded into stage $90_1$. This data byte will then ripple through adjacent empty stages until it reaches the last stage $90_i$. The byte may then be transferred to the other data bus from stage $90_i$. If the byte is not ready to be read onto the other bus, it will be held in stage $90_i$. Subsequent data bytes written into buffer 16 will ripple through the stages until encountering a full stage. Eventually, if no data bytes are read from buffer 16, buffer 16 will fill up and no more data bytes can be written to it until some bytes are read. As data bytes are read from buffer 16, the held bytes will ripple through in the manner described to fill the next open stage.

Figure 10:
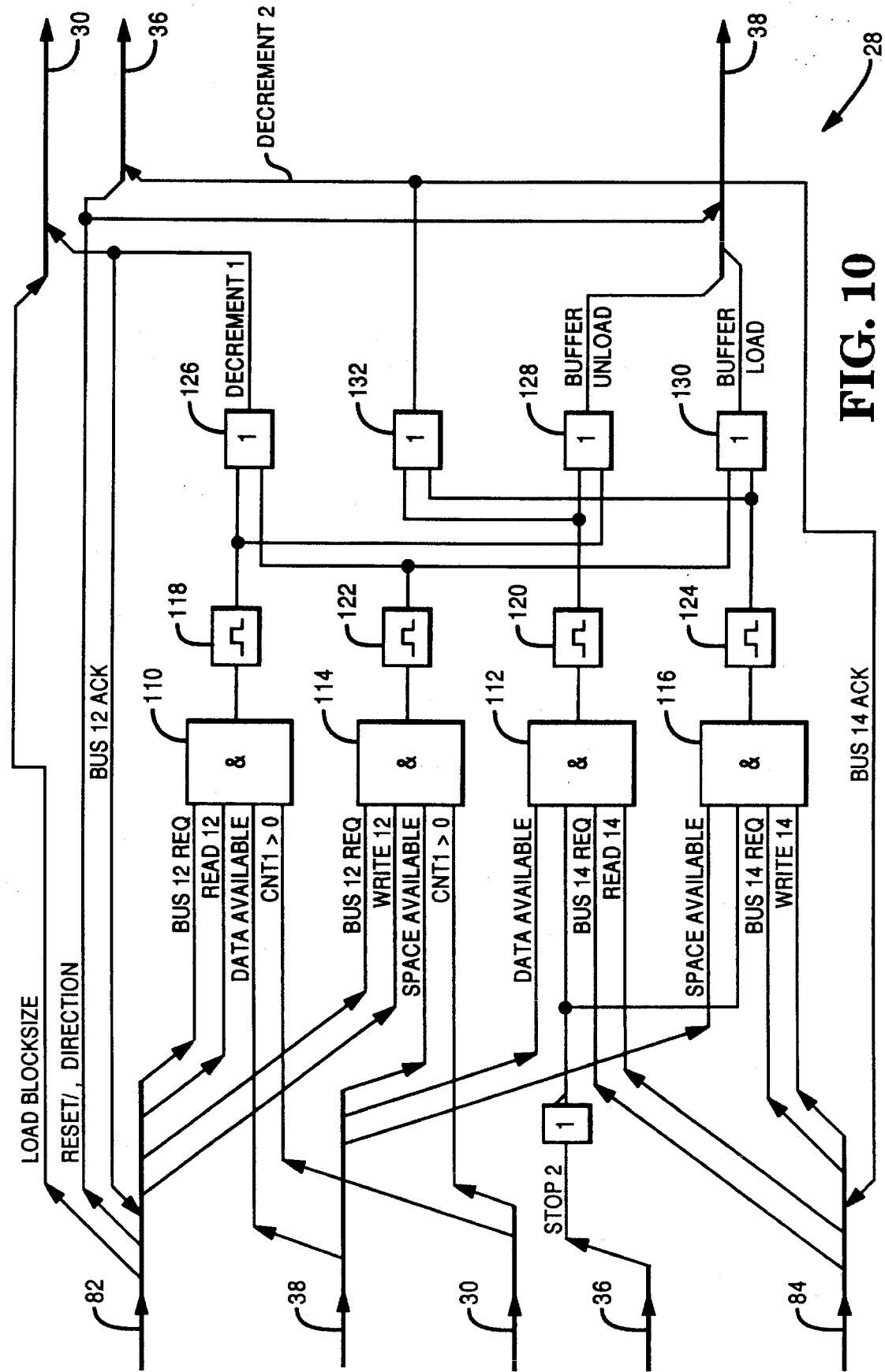
FIG. 10 is a circuit diagram of counter/buffer controller 28 shown in FIG. 1.

FIG. 10 is a circuit diagram of counter/buffer controller 28. Controller 28 receives various control signals on control busses 82 and 84 from entities associated with data busses 12 and 14, respectively, and receives control signals on bus 38 from buffer 16. Controller 28 includes AND gates 110, 112, 114 and 116, pulse generators 118, 120, 122 and 124 and OR gates 126, 128, 130 and 132. AND gate 110 receives BUS 12 REQ, DATA AVAILABLE, READ12 AND CNT1>0 signals from busses 82, 38, 82 and 30, respectively. The BUS 12 REQ signal indicates an entity on bus 12 is making a request for a data transfer. The DATA AVAILABLE signal is decoded from the FIFO flags and indicates that data is available in buffer 16 to be transferred. The READ12 signal indicates that the entity on bus 12 will read buffer 16. The CNT1>0 signal indicates that full counter 18 has not yet been decremented to 0. The CNT1>0 signal may be generated as the output of an OR gate the inputs of which are the CNTR1(0), CNTR(2), . . . CNTR(23) signals.

Alternatively, an inverted STOP1 signal may be substituted for the CNT1>0 signal. When all these signals are active, the output of AND gate 110 is high which activates pulse generator 118. The pulse signal is provided to counter 18 as the DECREMENT1 signal and is provided to data buffer 16 as the BUFFER UNLOAD signal. The pulse signal is returned to the entity on bus 12 by the BUS 12 ACK signal. As long as the input lines to AND gate 110 are active, data bytes are transferred out of buffer 16 and onto bus 12.

Similarly, AND gate 112 receives BUS 14 REQ, DATA AVAILABLE, READ14 AND STOP2/ signals from busses 84, 38, 84 and 36, respectively. The BUS 14 REQ signal indicates an entity on bus 14 is making a request for a data transfer. The DATA AVAILABLE signal indicates that data is available in buffer 16 to be transferred. The READ14 signal indicates that the entity on bus 14 will read buffer 16. The STOP2/ signal indicates that data bytes must yet be transferred across bus 14. When all these signals are active, the output of AND gate 112 is high which activates pulse generator 120. The pulse signal is provided to counter 20 as the DECREMENT2 signal and is provided to data buffer 16 as the BUFFER UNLOAD signal. The pulse signal is returned to the entity on bus 14 by the BUS 14 ACK signal. As long as the input lines to AND gate 112 are active, data bytes are transferred out of buffer 16 and onto bus 14.

AND gate 114 receives BUS 12 REQ, SPACE AVAILABLE, WRITE12 AND CNT1>0 signals from busses 82, 38, 82 and 30, respectively. The BUS 12 REQ signal indicates an entity on bus 12 is making a request for a data transfer. The SPACE AVAILABLE signal is decoded from the FIFO flags and indicates that space is available in buffer 16 to receive data. The WRITE12 signal indicates that the entity on bus 12 will write data to buffer 16. The CNT1>0 signal indicates that full counter 18 has not yet been decremented to 0. As noted above, an inverted STOP1 signal may be substituted for the CNT1>0 signal. When all these signals are active, the output of AND gate 114 is high which activates pulse generator 122. The pulse signal is provided to counter 18 as the DECREMENT1 signal and is provided to data buffer 16 as the BUFFER LOAD signal. As long as the input lines to AND gate 114 are active, data bytes are transferred from bus 12 into buffer 16.

Similarly, AND gate 116 receives BUS 14 REQ, SPACE AVAILABLE, WRITE14 AND STOP2/ signals from busses 84, 38, 84 and 36, respectively. The BUS 14 REQ signal indicates an entity on bus 14 is making a request for a data transfer. The SPACE AVAILABLE signal indicates that space is available in buffer 16 to receive data. The WRITE14 signal indicates that the entity on bus 14 will write data to buffer 16. As noted above, the STOP2/ signal indicates that data bytes must yet be transferred across bus 14. When all these signals are active, the output of AND gate 116 is high which activates pulse generator 124. The pulse signal is provided to counter 20 as the DECREMENT2 signal and is provided to data buffer 16 as the BUFFER LOAD signal. As long as the input lines to AND gate 116 are active, data bytes are transferred from bus 14 into buffer 16. It should be noted that the READ12, WRITE12, READ14 and WRITE14 signals are derived from the DIRECTION signal.

In operation, when a designated number d of data bytes are to be transferred between data busses 12 and 14, the number d is provided on bus 32 and is loaded into counter 18. In the embodiment described, counter 18 can count a 24 bit binary number which is equivalent to $2^{24}$ or 16,777,216. In general, the maximum number of data bytes that may be transferred between data busses 12 and 14 in one operation is limited by the capacity of counter 18. If counter 18 can hold n bits, its capacity is $2^n$. Since counter 18 is decremented for each data byte transferred between bus 12 and buffer 16, the maximum number of transferable data bytes in one operation is $2^{n-1}$. Thus, any number of data bytes less than $2^n$ are transferable, i.e., $2^n>d$.

As the designated number d is loaded into counter 18, lower order bits of d, provided on selected lines of bus 32, are loaded into counter 20. In the embodiment described, counter 20 receives the 6 low order bits of number d. Thus, counter 20 can count 6 bits which is equivalent to $2^6$ or 64. The number of bits in partial counter 18 can vary, but, in general, the number of bits will be twice the maximum byte capacity of buffer 16. In the described embodiment, data buffer 16 has a capacity of $2^5$ or 32. Thus, if the capacity of data buffer 16 is $2^k$, where k is an integer, 0<k<n, then the count capacity of counter 20 is $2^{k+1}$.

As counters 18 and 20 are loaded, the DIRECTION signal is provided on line 36 to decoder 24 indicating the direction of the data transfer. Assume that data is to be transferred from data bus 14 to data bus 12. Counter/buffer controller 28 provides a BUFFER LOAD strobe signal to data buffer 16 over a line of bus 38 and a data byte is latched into buffer 16 from data bus 14. Concurrently with receipt by buffer 16 of the BUFFER LOAD signal, controller 28 provides a DECREMENT2 signal to counter 20, and the value stored therein is decremented by one. Subsequent data bytes may similarly be loaded into buffer 16 from bus 14 and counter 20 decremented for each data byte transferred. If buffer 16 is full, it will provide a signal (a deactivated SPACE AVAILABLE signal) to controller 28 which will temporarily halt further data transfers into buffer 16. Controller 28 will also provide a BUFFER UNLOAD strobe signal to buffer 16 over a line of bus 38 when a data byte is available in buffer 16 and an entity on data bus 12 is ready to receive a data byte. Concurrently with receipt by buffer 16 of the BUFFER UNLOAD signal, controller 28 provides a DECREMENT1 signal to counter 18, and the value stored therein is decremented by one. Counter 18 is decremented for each data byte transferred from buffer 16 to data bus 12. Provided the entity on bus 12 receiving data is ready and system 10 has access to bus 12, data bytes can be transferred out of buffer 16 as long as there are bytes available. If buffer 16 is empty, it will provide a signal (a deactivated DATA AVAILABLE signal) to controller 28 which will temporarily halt further data transfers out of buffer 16.

As described, counter 18 counts the total number of data bytes transferred between buffer 16 and data bus 12. Counter 20 counts data bytes as they are transferred between data bus 14 and buffer 16. Since the number of data bytes to be transferred is generally much greater than the count capacity ($2^{k+1}$) of counter 20, counter 20 will roll over on a $2^{k+1}$ frequency. In other words, counter 20 is a modulo $2^{k+1}$ counter. When it reaches a count of 0 and is again decremented, its count goes to $2^{k+1}-1$.

Decoder 22 generates a STOP1 signal indicating that the designated number d of data bytes have been transferred from buffer 16 to data bus 12. Similarly, decoder 24 generates a STOP2 signal indicating that the designated number d of data bytes have been transferred from data bus 14 to buffer 16. Collectively, the STOP1 and STOP2 signals indicate that d data bytes have been transferred between data busses 14 and 12. The STOP1 and STOP2 signals are generally provided to the transmitting/receiving entities connected to data busses 12 and 14, respectively. However, in some applications neither of the signals may be required.

FIG. 5 shows the decoder 22 logic for generating the

STOP1 signal when the count in counter 18 reaches zero, for generating the LT(64) signal when the count falls below 64 ($2^{k+1}$, k=5) and for generating the LT(32) signal when the count falls below 32 ($2^k$, k=5) The logic shown in FIG. 6 decodes the LT(64) and LT(32) signals together with the DIRECTION signal to generate the STOP2 signal. For example, if data is being transferred from data bus 12 to bus 14, the DIRECTION signal has the value "0", and the LT(64) signal is ignored. Since the inverted DIRECTION signal is "1", when the LT(32) signal is active and the value in counter 20 is zero, the STOP2 signal will be asserted. It should be noted that if the logic were to respond when LT(64) is asserted, a premature STOP2 signal could be generated, i.e., counter 20 would have needed to roll over one more time.

In contrast, if data is transferred from data bus 14 to bus 12, the DIRECTION signal has the value "1". When the LT(64) signal is active and the value in counter 20 is zero, the STOP2 signal will be asserted. It may be appreciated that for a transfer from bus 14 to bus 12 the last byte will be transferred to buffer 16 before the last byte is transferred out to bus 12. If buffer 16 is full after the last byte is transferred from bus 14, 32 bytes will remain to be transferred before STOP1 is generated. Irrespective of the amount of data in buffer 16 when it receives the last data byte from bus 14, the STOP2 signal is generated before the STOP1 signal.

An architecture for implementing data buffer transfers might also use two full counters for tracking data transfers into and out of, respectively, the data buffer. Each counter would be initially provided with the total number of data bytes to be transferred. One of the counters will be decremented when data bytes are written into the buffer from one bus and the other of the counters will be decremented for each data byte read out onto the other bus. When the first counter is decremented to zero, a signal may be sent to the transmitting entity on the first bus indicating an end of transfer, and when the second counter is decremented to zero, a signal is sent to the receiving entity on the second bus indicating an end of transfer.

The use of two full counters eliminates the need for signals from one counter to the other. However, each full counter requires a significant number of logic gates. For a system capable of large block transfers of data, the number of logic gates in two such full counters will consume a larger amount of board space or silicon than one full and one partial counter.

It will be clear to those skilled in the art that the present invention is not limited to the specific embodiment disclosed and illustrated herein. For example, the invention is not limited to the specific buffer shown in FIGS. 7–9. Other buffers, including parallel stacked buffers for receiving multiple data bytes from one or both data busses are envisioned.

Numerous modifications, variations, and full and partial equivalents can be undertaken without departing from the invention as limited only by the spirit and scope of the appended claims.

What is desired to be secured by Letters Patent of the United States is as follows.

What is claimed is:

1. A system for transferring a designated number d of data bytes in a data block from a first to a second data bus comprising:

a data buffer, having a capacity of less than d data bytes, connected between said busses;

a first counter for counting the total number of data bytes in said data block transferred from said first bus to said buffer, said first counter having a count capacity greater than capacity of said buffer;

a second counter for counting data bytes transferred from said buffer to said second bus; and means connected to said counters for indicating when d data bytes have been transferred from said first bus to said buffer and from said buffer to said second bus.

2. The system of claim 1 further comprising:

means for providing the number d to said first counter.

3. The system of claim 2 wherein:

said first counter can hold a maximum count of $2^n$, where n is a positive integer and $2^n > d$; and d is provided to said first counter as an n bit binary number.

4. The system of claim 3 wherein said second counter is a modulo $2^{k+1}$ counter, where k is an integer, $0 < k < n$, and $2^k =$ buffer data byte capacity.

5. The system of claim 4 further comprising:

means for providing the k+1 low order bits of said n bit binary number to said second counter.

6. The system of claim 5 wherein:

said first counter is decremented for each data byte transferred from said first bus to said buffer; and said second counter is decremented for each data byte transferred from said buffer to said second bus, said second counter rolling over on a $2^{k+1}$ frequency.

7. The system of claim 1 wherein said indicating means includes means for generating a first signal indicating when d data bytes have been transferred from said first bus to said buffer and a second signal indicating when d data bytes have been transferred from said buffer to said second bus.

8. The system of claim 7 wherein said generating means comprises:

a first decoder connected to said first counter for receiving a count from said first counter;

a second decoder connected to said second counter for receiving a count from said second counter; and a signal bus connecting said first and second decoders.

9. The system of claim 8 wherein:

$2^k =$ buffer data byte capacity, where k is a positive integer;

said first decoder generates said first signal, and further generates third and fourth signals;

said third signal indicates less than $2^{k+1}$ data bytes remain to be transferred from said first bus to said buffer; and said fourth signal indicates less than $2^k$ data bytes remain to be transferred from said first bus to said buffer.

10. The system of claim 9 wherein:

said second decoder receives said third and fourth signals and generates said second signal, in response to the third and fourth signals.

11. The system of claim 1 wherein said data buffer is a fall through, FIFO device having a plurality of adjacent stages, data bytes from the first bus are received at a first stage and ripple through adjacent empty stages, and wherein data bytes are transferred to the second bus from the last stage.

12. The system of claim 1 wherein said buffer includes:

means for receiving a first strobe signal to transfer data from said first bus to said buffer; and means for receiving a second strobe signal to transfer data from said buffer to said second bus.

13. The system of claim 12 wherein:

said first counter includes means for receiving a first count changing signal concurrently with receipt by said buffer of said first strobe signal; and said second counter includes means for receiving a second count changing signal concurrently with receipt by said buffer of said second strobe signal.

14. The system of claim 13 wherein said first and second count changing signals decrement said counters.

15. A system for transferring a designated number d of data bytes in a data block from a first to a second data bus comprising:

a data buffer, having a capacity of less than d data bytes, connected between said busses;

a first counter for counting the total number of data bytes in said data block transferred from said first bus to said buffer, wherein said first counter can hold a maximum count of $2^n$, where n is a positive integer and $2^n > d$;

a second counter for counting data bytes transferred from said buffer to said second bus, wherein said second counter is a modulo $2^{k+1}$ counter, where k is an integer, $0 < k < n$, and $2^k$ = buffer data byte capacity;

means for providing the number d to said first counter, d being provided to said first counter as an n bit binary number, and for providing the k+1 low order bits of said n bit binary number to said second counter;

a first decoder connected to said first counter for generating a first signal indicating when d data bytes have been transferred from said first bus to said buffer; and a second decoder connected to said second counter for generating a second signal indicating when d data bytes have been transferred from said buffer to said second bus.

16. The system of claim 15 wherein:

said first counter is decremented for each data byte transferred between said first bus and said buffer; and said second counter is decremented for each data byte transferred between said second bus and said buffer, said second counter rolling over on a $2^{k+1}$ frequency.

17. The system of claim 16 further comprising a signal bus connecting said first and second decoders, wherein:

said first decoder generates said first signal, and further generates third and fourth signals;

said third signal indicates less than 2k+1 data bytes remain to be transferred between said first bus and said buffer;

said fourth signal indicates less than 2k data bytes remain to be transferred between said first bus and said buffer; and said second decoder receives said third and fourth signals over said bus and generates said second signal, in response to the third and fourth signals.

18. The system of claim 17 wherein:

said data buffer is a fall through, FIFO device having a plurality of adjacent stages, data bytes from the first bus are received at a first stage and ripple through adjacent empty stages, and wherein data bytes are transferred to the second bus from the last stage;

said buffer includes means for receiving a first strobe signal to transfer data between said first bus and said buffer, and means for receiving a second strobe signal to transfer data between said buffer and said second bus;

said first counter includes means for receiving a first decrementing signal concurrently with receipt by said buffer of said first strobe signal; and said second counter includes means for receiving a second decrementing signal concurrently with receipt by said buffer of said second strobe signal.

19. A method for transferring a designated number d of data bytes between first and second data busses connected by a data buffer, said buffer having a capacity of less than d data bytes, comprising:

loading a first counter with the number d;

loading a second counter with a number less than d;

transferring data bytes between said first bus and buffer and decrementing said first counter with each such transfer;

transferring data bytes between said buffer and said second bus and decrementing said second counter with each such transfer; and generating first and second signals in response to the counts in said counters indicating when d data bytes have been transferred between said busses.

20. The method of claim 19 wherein said first counter can hold a maximum count of $2^n$, where n is a positive integer and $2^n > d$, said second counter is a modulo $2^{k+1}$ counter, where k is an integer, $0 < k < n$, and $2^k$ = buffer data byte capacity, and wherein:

d is provided to said first counter as an n bit binary number when loading said first counter; and the k+1 low order bits of said n bit binary number are provided to said second counter when loading said second counter.

21. A data transfer system comprising:

a first counter for counting data transfers through one port of a buffer, said first counter having a count capacity greater than capacity of said buffer;

a second counter for counting data transfers through another port of said buffer; and decoding circuitry connected to each of said counters, said circuitry receiving selected count information from each of said counters to indicate when a predetermined amount of data, greater than the capacity of the buffer, has been transferred through said buffer.

22. The data transfer system of claim 21 wherein said first counter has a count capacity greater than said second counter.

* * * * *